United States Patent
Makar et al.

(10) Patent No.: US 9,432,556 B2
(45) Date of Patent: Aug. 30, 2016

(54) DEVICES AND METHODS FOR FACILITATING FRAME DROPPING IN REMOTE DISPLAY APPLICATIONS

(71) Applicant: QUALCOMM Incorporated, San Diego, CA (US)

(72) Inventors: Mina Ayman Saleh Yanni Makar, San Diego, CA (US); Hongyu Jiang, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/589,481

(22) Filed: Jan. 5, 2015

(65) Prior Publication Data

US 2016/0198068 A1    Jul. 7, 2016

(51) Int. Cl.
*H04N 9/475* (2006.01)
*H04N 5/067* (2006.01)
*H04N 5/38* (2006.01)
*H04N 21/41* (2011.01)
*H04N 21/4363* (2011.01)
*H04N 21/414* (2011.01)

(52) U.S. Cl.
CPC ............. *H04N 5/0675* (2013.01); *H04N 5/38* (2013.01); *H04N 21/4122* (2013.01); *H04N 21/41407* (2013.01); *H04N 21/43637* (2013.01)

(58) Field of Classification Search
CPC . H04L 43/0852; H04L 47/283; H04L 47/29; H04L 7/04; H04L 5/073; H04L 5/04; H04L 5/067; H04L 5/0733; H04L 7/0112; H04L 7/014; H04L 7/122; H04L 7/01; H04L 7/50; H04L 7/12; H04L 7/0135; H04L 7/0125; H04L 7/012; H04L 3/32
USPC .......... 348/518, 519, 440.1, 439.1, 458, 459
IPC .................................... H04N 9/475, 7/12, 7/01
See application file for complete search history.

(56) References Cited

U.S. PATENT DOCUMENTS

| 6,356,309 B1 * | 3/2002 | Masaki .................. G06T 9/005 348/439.1 |
| 2013/0222210 A1 | 8/2013 | Wang et al. |
| 2014/0096164 A1 | 4/2014 | Bei et al. |

FOREIGN PATENT DOCUMENTS

WO    WO-9900984 A1    1/1999

OTHER PUBLICATIONS

International Search Report and Written Opinion—PCT/US2015/067360—ISA/EPO—Mar. 24, 2016.

* cited by examiner

*Primary Examiner* — Sherrie Hsia
(74) *Attorney, Agent, or Firm* — Loza & Loza LLP

(57) ABSTRACT

Source devices are adapted to facilitate video data streaming to a sink device. According to one example, a source device can capture a plurality of frames of video data, each frame including a set of graphical command tokens. Responsive to a delay between the source device and a sink device, the source device can select one or more frames of the plurality of frames to be dropped. The source device may transmit the plurality of frames of video data to a sink device, without transmitting the one or more frames selected to be dropped. Other aspects, embodiments, and features are also included.

28 Claims, 10 Drawing Sheets

DEVICES AND METHODS FOR FACILITATING FRAME DROPPING IN REMOTE DISPLAY APPLICATIONS

TECHNICAL FIELD

The technology discussed below relates to techniques for streaming video data from a source device to a sink device.

BACKGROUND

With modern electronic devices, it sometimes occurs that a user desires to wirelessly display content, such as video, audio, and/or graphical content, from one electronic device on another electronic device. In many instances the ability to convey the content wirelessly is also desired. Generally speaking, in such a wireless display system, a first wireless device "source device" may provide content via a wireless link to a second wireless device "sink device" where the content can be played back. The content may be played back at both a local display of the source device and at a display of the sink device. More specifically, the sink device renders the received content on its display and audio equipment.

By utilizing wireless capabilities to form a wireless connection between the two devices, a source device can take advantage of better display and/or audio capabilities of a sink device (e.g., a digital television, projector, audio/video receiver, etc.) to display content that is initially stored in, or streamed to, the source device. As the demand for such technologies continues to increase, research and development continue to advance and enhance the user experience.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate transmission of video data from a source device to a sink device. According to at least one aspect of this disclosure, source devices may include a communications interface coupled with a processing circuit. The processing circuit may include logic to capture a plurality of frames of video data, where each frame includes a set of graphical command tokens. The processing circuit may farther include logic to determine that a delay between the source device and a sink device is above a threshold, and responsively select at least one frame to be dropped. The processing circuit may also include logic to transmit the plurality of frames of video data, without the at least one dropped frame, via the communications interface.

Further aspects provide methods operational on access terminals and/or access terminals including means to perform such methods. One or more examples of such methods may include capturing a plurality of frames of video data, where each frame includes a set of graphical command tokens. A delay between the source device and a sink device may be determined to be above a threshold. In response to the delay being above the threshold, at least one frame may be selected to be dropped, and the plurality of frames of video data may be transmitted without the at least one dropped frame.

Still further aspects include processor-readable storage mediums comprising programming executable by a processing circuit. According to one or more examples, such programming may be adapted for causing the processing circuit to capture a plurality of frames of video data, where each frame includes a set of graphical command tokens. The programming may further be adapted for causing the processing circuit to determine a delay between the source device and a sink device is above a threshold, and select at least one frame to be dropped in response to the delay. The programming may further be adapted for causing the processing circuit to transmit the plurality of frames of video data without transmitting the at least one frame selected to be dropped.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in Hock diagram form to avoid obscuring the described concepts and features.

Figure 1:
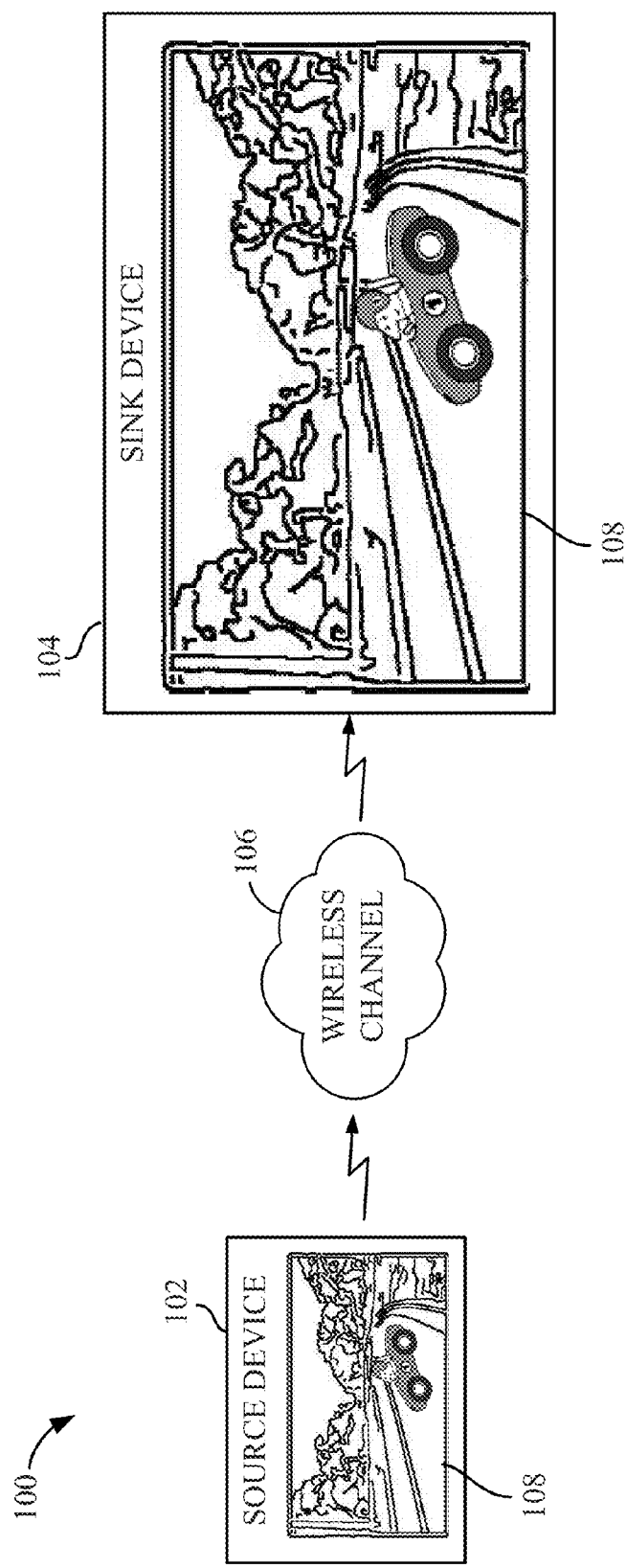
FIG. 1 is a conceptual block diagram of an example wireless display (WD) system in which a source device is configured to transmit compressed graphical commands to a sink device over a communication channel, in accordance with one or more techniques of this disclosure.

The various concepts presented throughout this disclosure may be implemented across a broad variety of wireless communication systems, network architectures, and communication standards. Referring now to FIG. 1, a conceptual diagram of an example wireless display (WD) system in accordance with one or more techniques of the disclosure is illustrated. The wireless display system 100 facilitates wireless transmission of graphical commands from a source device 102 to a sink device 104 over a wireless communication channel 106.

The source device 102 may be an electronic device adapted to transmit video data 108 to a sink device 104 over a communication channel 106. Examples of a source device 102 include, but are not limited to devices such as smartphones or other mobile handsets, tablet computers, laptop computers, e-readers, digital video recorders (DVRs), desktop computers, wearable computing devices (e.g., smart watches, smart glasses, and the like), and/or other communication computing device that communicates, at least partially, through wireless communications.

The sink device 104 may be an electronic device adapted to receive the video data 108 conveyed over the communication channel 106 from the source device 102. Examples of a sink device 104 may include, but are not limited to devices such as smartphones or other mobile handsets, tablet computers, laptop computers, e-readers, digital video recorders (DVRs), desktop computers, wearable computing devices (e.g., smart watches, smart glasses, and the like), televisions, monitors, and/or other communication/computing device with a visual display and with wireless communication capabilities.

The wireless communication channel 106 is a channel capable of propagating communicative signals between the source device 102 and the sink device 104. In some examples, the communication channel 106 may be a wireless communication channel. For example, the wireless communication channel 106 may be implemented in radio frequency communications in one or more frequency bands, such as the 2.4 GHz band, 5 GHz hand, 60 GHz band, or other frequency hands. In some examples, the communication channel 106 may comply with one or more sets of standards, protocols, or technologies such as wireless universal serial bus (WUSB) (as promoted by the Wireless USB Promoter Group), Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), as well as one or more other standards, protocols, or technologies. The frequency bands used, such as the 2.4 GHz, 5 GHz, and 60 GHz hands, may be defined for purposes of this disclosure as they are understood in light of the standards of Wi-Fi, WiGig, any one or more IEEE 802.11 protocols, or other applicable standards or protocols.

As depicted by FIG. 1, the source device 102 may have video data 108 to be conveyed. The source device 102 can convey the video data 108 via the wireless communication channel 106 to the sink device 104. In some examples, a "graphics domain" transmission method may be used by the source device 102 to stream deconstructed video frames to the sink device 104. Graphics domain transmissions may be accomplished by capturing the video data 108 at the source device (e.g., at an input of a GPU of the source device 102) in the form of graphics command tokens (e.g., tokens of OpenGL commands) and texture elements, and conveying the command tokens and texture elements to the sink device 104. The sink device 104 (e.g., a GPU at the sink device 104) may render the command tokens and texture elements into displayable frames, and output the rendered frames at a display of the sink device 104.

Graphics domain transmission methods can be beneficial in several aspects. For example, if the sink device 104 employs a display with a greater resolution than the source device 102, the sink device 104 can employ the graphics command tokens (e.g., tokens of OpenGL commands) and texture elements to render the frame at a higher resolution with similar quality. Another example includes the ability to send a texture element that may be used in many frames, enabling the source device 102 to send the texture element a single time to be employed by the sink device 104 to render several different frames.

Figure 2:
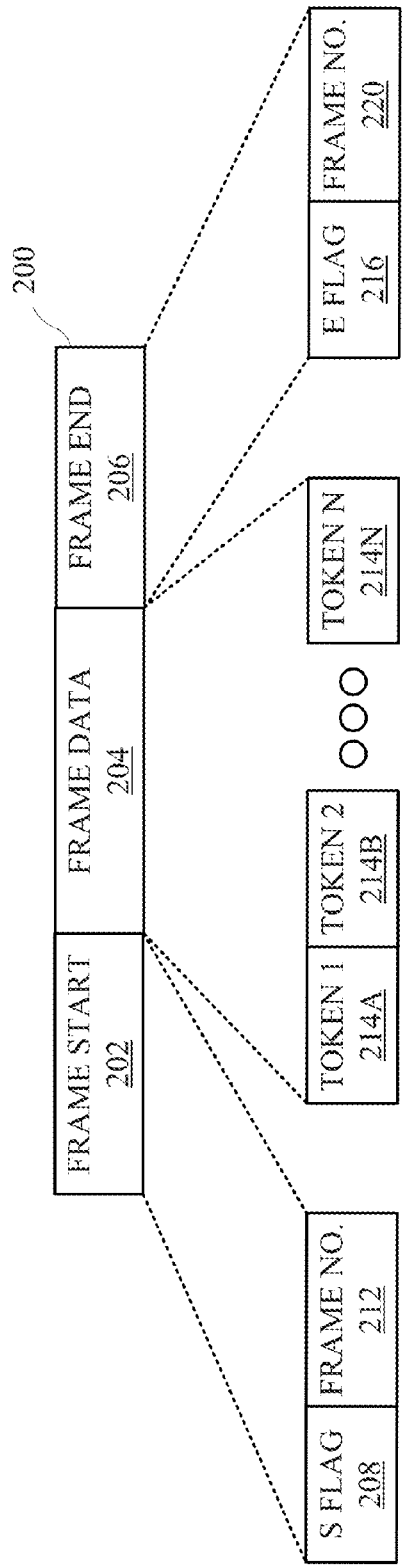
FIG. 2 is a conceptual block diagram illustrating an example of a command frame that may be output by the source device to stream video data to the sink device, according to at least one example of the present disclosure.

Turning to FIG. 2, a conceptual block diagram is depicted, illustrating an example of a command frame 200 that may be output by the source device 102 to stream video data 108 to the sink device 104, according to at least one example of the present disclosure. As illustrated, the command frame 200 can include a frame start field 202, a frame data field 204, and a frame end field 206.

The frame start field 202 may include a start flag 208 and frame number field 212. The frame start field 202 may indicate the beginning of a command frame 200 (e.g., within a data stream). The frame number field 212 may indicate a sequence number of the command frame 200. The value of the frame number field 212 may increment for subsequent frames. For instance, the value of the frame number field 212 may be n for a current frame and n+1 for a next frame.

The frame data field 204 may include a plurality of graphical command tokens 214A-214N (collectively, "tokens 214"). Each of the tokens 214 may correspond to a particular token of a graphical command. Further details of one example of a token of the tokens 214 are provided below with reference to FIG. 3.

The frame end field 206 may include an end flag 216 and a frame number field 220. The end flag 216 may indicate the beginning of the frame end field 206 (e.g., within a data stream). The frame number field 220 may indicate a sequence number of the command frame 200.

Figure 3:
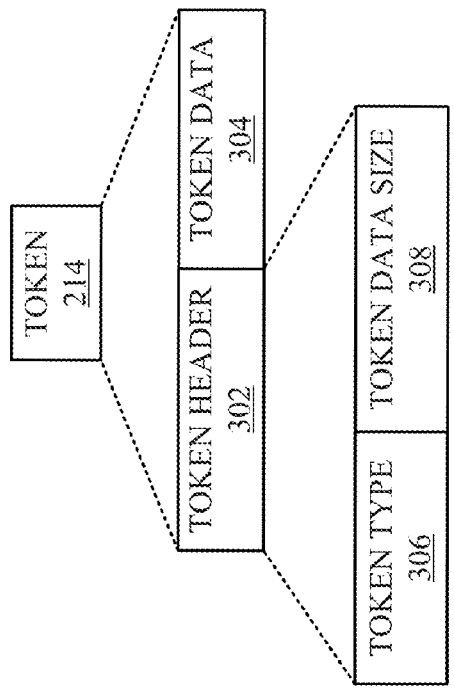
FIG. 3 is a conceptual diagram illustrating further details of one example of a graphical command token.

FIG. 3 is a conceptual diagram illustrating further details of one example of a graphical command token, in accordance with one or more techniques of this disclosure. As illustrated in FIG. 3, the token 214 may include a token header field 302 and a token data field 304. The token header field 302 may indicate one or more characteristics of the token 214. In some examples, the token header field 302 may be a fixed length, such as 12 bytes. As illustrated in FIG. 3, the token header field 302 may include a token type 306 and a token data size 308. The token type 306 may indicate which graphical command of a set of graphical commands corresponds to the token 214. That is, the token type 306 may indicate which graphical command the token 214 is a token of. The token data size 308 may indicate a size of the token data field 304 (e.g., in bytes).

The token data field 304 may indicate one or more arguments for the token 214. For instance, if the graphical command type indicated by the token type 306 takes two arguments, the token data field 304 may include data for the two arguments.

As noted above, graphics domain transmissions can enable the source device 102 to send graphics command tokens (e.g., tokens of OpenGL commands) and texture elements, where the same texture elements may be used in multiple frames. Such graphics domain transmissions can enable the source device 102 to send the texture element a single time to be employed by the sink device 104 to render several different frames. In some instances, the texture elements may be relatively large in size, compared to the graphics command tokens. The relatively large size of the texture elements can result in peaks of data to the transmitted by the source device 102.

Figure 4:
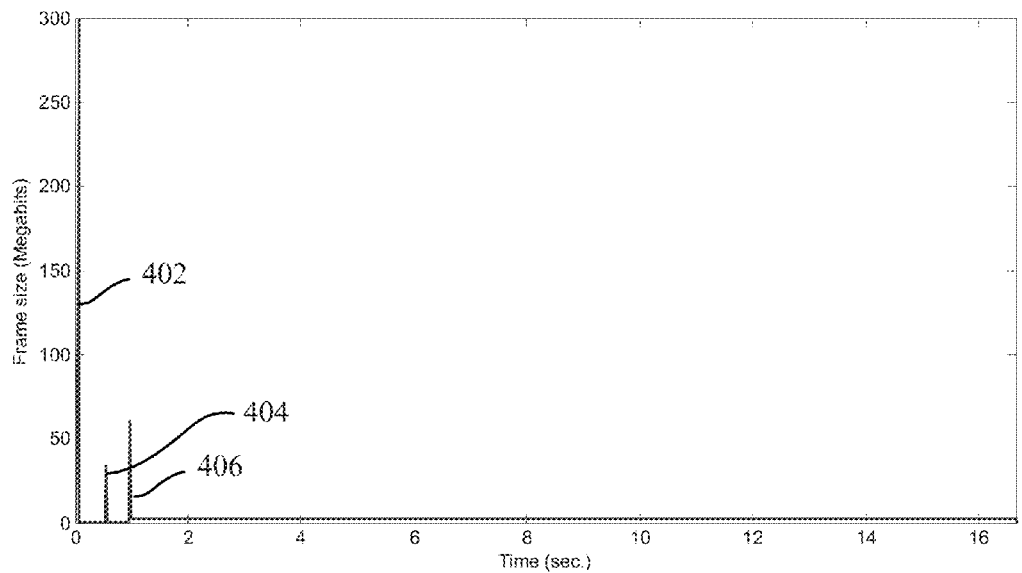
FIG. 4 is a graph illustrating a frame sizes over a period of time when initiating screen sharing for a video game known as FRUIT NINJA according to at least one example.

For example, FIG. 4 is a graph illustrating a frame sizes over time when initiating screen sharing for a video game known as FRUIT NINJA. As shown, there several data peaks during game play. For instance, there is a peak 402 at the beginning of around 300 Megabits (Mb) of data that is transmitted when the game is initiated. This may include several texture elements, such as the background of the game and different fruits used the render the frames in the game. These textures typically need to be available at the sink device 104 before it can start displaying the game. Other data peaks 404 and 406 also occur within about the first second of the game. Outside of the relatively larger data peaks, the other frames (e.g., with graphics command tokens) may be relatively small.

Figure 5:
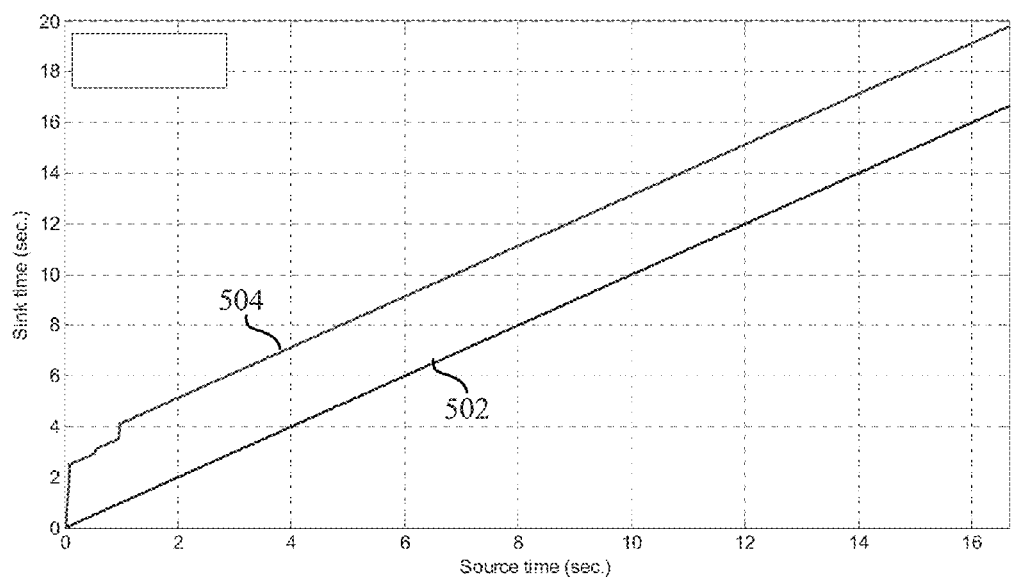
FIG. 5 is a graph illustrating a delay between a source device and a sink device resulting from the frame transmissions associated with FIG. 4.

In some instances, the relatively large frames at the data peaks may result in delays in transmissions. For example, assuming an available bit-rate is 200 Megabits per second (Mbps), there would be a delay between the data at the source device 102 and the data at the sink device 104. FIG. 5 is a graph illustrating this delay between the devices. The graph in FIG. 5 illustrates the time when each frame is rendered at the source device 102 and at the sink device 104. In the graph, it would be desirable to have each frame rendered substantially at the same time at the source device 102 and the sink device 104, as shown by the reference line 502. However, the initial data peak 402 in FIG. 4 results in a significant delay, such that there is more than a two second delay from when a frame is rendered at the source device 102 until the same frame is rendered at the sink device 104. Further, there is another delay corresponding to the third data peak 406 in FIG. 4, such that there is about a three second delay between the source device 102 and the sink device 104, as depicted by line 504.

In this example for a video game, a three second delay can significantly affect the user experience. For instance, actions and controls that are occurring on the game will be displayed on the sink device 104 around three seconds after they occur on the source device 102. Such a delay can be a problem, and may render actual use of a wireless display system substantially useless while playing such a game.

According to aspects of the present disclosure, source devices are adapted to drop one or more frames to bring a source device and a sink device into more close alignment. For example, the source device 102 can identify frames that are candidates to be dropped, and can then skip transmission of one or more of such frames until the source device and sink device are sufficiently aligned.

Figure 6:
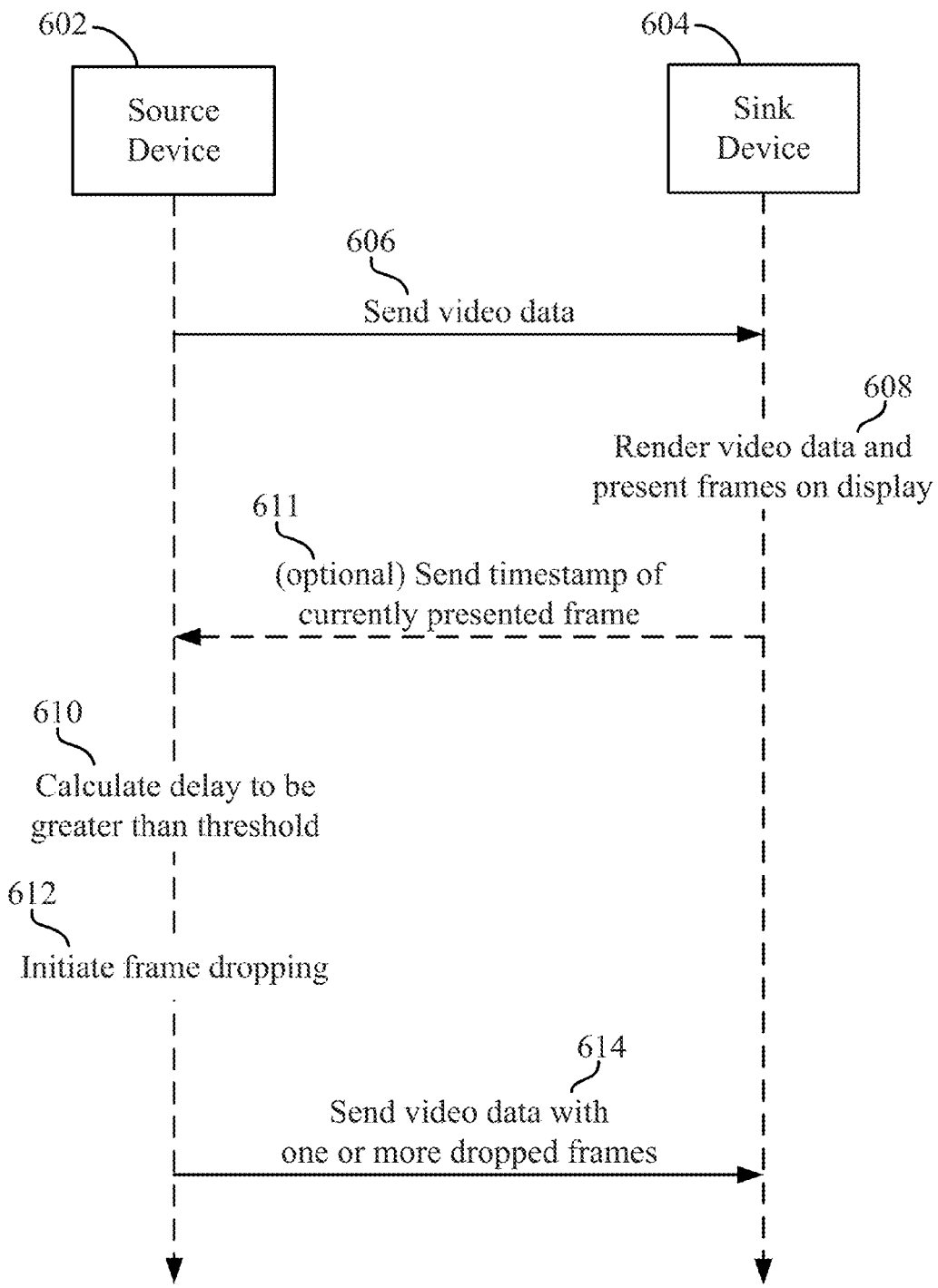
FIG. 6 is a flow diagram illustrating frame dropping operations between a source device and a sink device in accordance with at least one example of this disclosure.

Referring to FIG. 6, a flow diagram is illustrated showing frame dropping operations between a source device 602 and a sink device 604 in accordance with at least one example of this disclosure. The source device 602 can initially send an amount of video data 606 to a sink device 604. This transmission may include streamed video data in the form of graphical command tokens and texture elements. In some examples, this video data may be encapsulated in a command frame, such as the command frame 200 of FIG. 2.

The sink device 604 can render the video data and present frames on a display at 608. As noted above with reference to FIGS. 4 and 5, there may occur a delay between the video data at the source device 602 and the video data displayed at the sink device 604. According to an aspect of the present disclosure, the source device 602 may calculate a delay 610 for the video data, in some examples, the source device 602 may calculate the delay by comparing a timestamp of the current frame that will be sent against the current system time on the source device 602. If the difference is greater than a predefined threshold, then the current frame may be determined to be late.

In some examples, the sink device 604 may send a message 611 to the source device 602, where the message includes a timestamp of the currently presented frame at the sink device 604. This message 611 is shown as optional in FIG. 6 because some implementations may not employ such messaging to calculate the delay. In this example, the source device 602 can calculate the delay by comparing the timestamp of the currently presented frame as reported by the sink device 604 against the current system time on the source device 602. The source device 602 may also take into account round trip times to determine the delay between displays at the two devices. If the calculated delay is greater than a predefined threshold, then the source device 602 determine that the currently presented frame is late.

Regardless of which technique is employed to calculate the delay, when the source device 602 determines that the delay is greater than a threshold, the source device 602 can initiate frame dropping 612. Accordingly, the source device 602 can send video data 614 to the site device 604, where the video data has dropped one or more frames. That is, the source device 602 may skip transmission of one or more frames when streaming the video data to the sink device 604.

Figure 7:
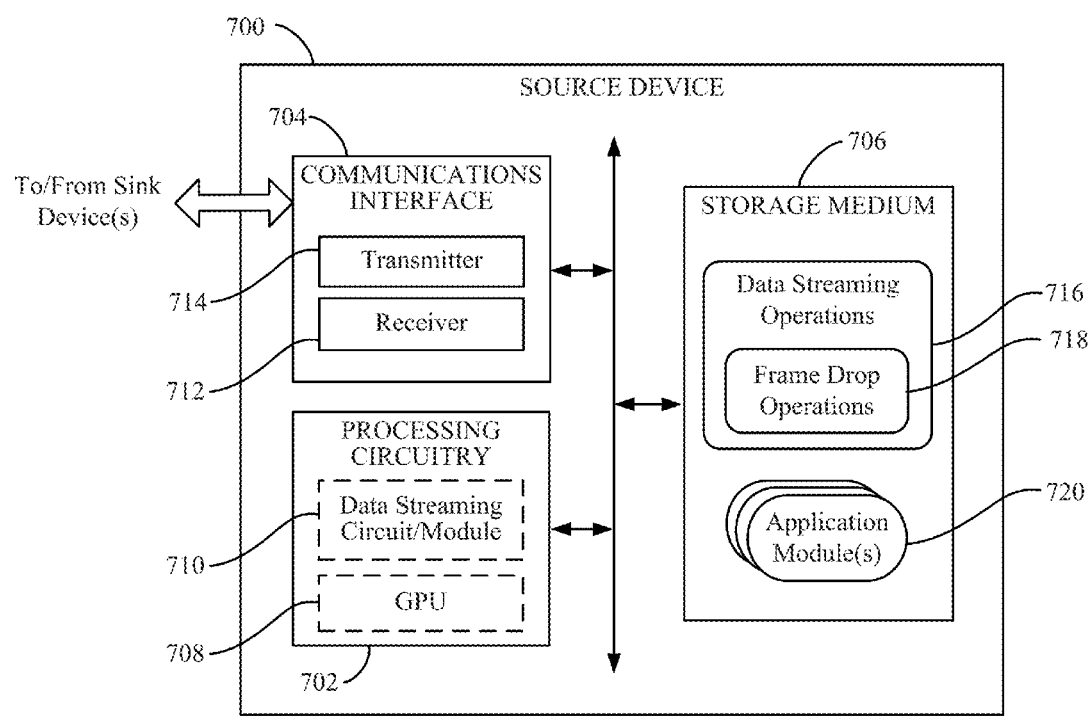
FIG. 7 is a block diagram illustrating select components of a source device according to at least one example.

Turning to FIG. 7, a block diagram is shown illustrating select components of a source device 700 according to at least one example of the present disclosure. The source device 700 includes processing circuitry 702 coupled to or placed in electrical communication with a communications interface 704 and a storage medium 706.

The processing circuitry 702 includes circuitry arranged to obtain, process and/or send data, control data access and storage, issue commands, and control other desired operations. The processing circuitry 702 may include circuitry adapted to implement desired programming provided by appropriate media, and/or circuitry adapted to perform one or more functions described in this disclosure. For example, the processing circuitry 702 may be implemented as one or more processors, one or more controllers, and/or other structure configured to execute executable programming and/or execute specific functions. Examples of the processing circuitry 702 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuitry 702 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuitry 702 are for illustration and other suitable configurations within the scope of the present disclosure are also contemplated.

The processing circuitry 702 can include circuitry adapted for processing data, including the execution of programming, which may be stored on the storage medium 706. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuitry 702 may include a graphics processing unit (GPU) 708 and/or a video data streaming circuit or module 710. The GPU 708 generally includes circuitry and/or programming (e.g., programming stored on the storage medium 706) adapted for processing graphical data and rendering frames of video data based on one or more texture elements and graphical command tokens for display by a user interface.

The data streaming circuit/module 710 may include circuitry and/or programming (e.g., programming stored on the storage medium 706) adapted to stream video data in the form of graphical command tokens and texture elements to a sink device. In some examples, the data streaming circuit/module 710 may encapsulate the graphical command tokens in a command frame, such as the command frame 200 of FIG. 2. In some examples, the data streaming circuit/module 710 may capture the graphical command tokens and/or texture elements at an input of a GPU, such as the GPU 708. In some examples, the data streaming circuit/module 710 may identify droppable frames and cause those frames to be skipped from transmission to a sink device, as described in more detail herein below.

As used herein, reference to circuitry and/or programming associated with the source device 700 may be generally referred to as logic (e.g., logic gates and/or data structure logic).

The communications interface 704 is configured to facilitate wireless communications of the source device 700. For example, the communications interface 704 may include circuitry and/or programming adapted to facilitate the communication of information bi-directionally with respect to one or more sink devices. The communications interface 704 may be coupled to one or more antennas (not shown), and includes wireless transceiver circuitry, including at least one receiver 712 (e.g., one or more receiver chains) and/or at least one transmitter 714 (e.g., one or more transmitter chains).

The storage medium 706 may represent one or more processor-readable devices for storing programming, such as processor executable code or instructions (e.g., software, firmware), electronic data, databases, or other digital information. The storage medium 706 may also be used for storing data that is manipulated by the processing circuitry 702 when executing programming. The storage medium 706 may be any available media that can be accessed by a general purpose or special purpose processor, including portable or fixed storage devices, optical storage devices, and various other mediums capable of storing, containing and/or carrying programming. By way of example and not limitation, the storage medium 706 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 706 may be coupled to the processing circuitry 702 such that at least some of the processing circuitry 702 can read information from, and write information to, the storage medium 706. That is, the storage medium 706 can be coupled to the processing circuitry 702 so that the storage medium 706 is at least accessible by the processing circuitry 702, including examples where the storage medium 706 is integral to the processing circuitry 702 and/or examples where the storage medium 706 is separate from the processing circuitry 702 (e.g., resident in the source device 700, external to the source device 700, distributed across multiple entities).

The storage medium 706 may include programming stored thereon. Such programming, when executed by the processing circuitry 702, can cause the processing circuitry 702 to perform one or more of the various functions and/or process steps described herein. In at least some examples, the storage medium 706 may include data streaming operations 716. The data streaming operations 716 are adapted to cause the processing circuitry 702 to stream video data in the form of graphical command tokens and texture elements to a sink device. In some examples, the data streaming operations 716 may include frame drop operations 718 adapted to cause the processing circuitry 702 to identify droppable frames from the video data stream, and cause those frames to be skipped from transmission to a sink device, as described in more detail herein below.

The storage medium 706 may also include application modules 720 which may each represent an application provided by an entity that manufactures the source device 700, programming operating on the source device 700, and/or an application developed by a third-party for use with the source device 700. Examples of application modules 720 may include applications for gaming, shopping, travel routing, maps, audio and/or video presentation, word processing, spreadsheets, voice and/or calls, weather, etc. One or more application modules 720 may include texture elements associated therewith. For example, where a gaming application of the application modules 720 entails the slicing of falling fruit (e.g., watermelons, avocados, pineapples, etc.), there may be texture elements associated with the gaming application that may include a graphical representation of each of the types of fruit, as well as backgrounds. Such texture elements may be stored in a plurality of formats, such as RGBα 8888, RGBα 4444, RGBα 5551, RGB 565, Yα 88, and α 8.

According to one or more aspects of the present disclosure, the processing circuitry 702 is adapted to perform (independently or in conjunction with the storage medium 706) any or all of the processes, functions, steps and/or routines for any or all of the source devices described herein (e.g., source device 102, source device 602, source device 700). As used herein, the term "adapted" in relation to the processing circuitry 702 may refer to the processing circuitry 702 being one or more of configured, employed, implemented, and/or programmed (in conjunction with the storage medium 706) to perform a particular process, function, step and/or routine according to various features described herein.

Figure 8:
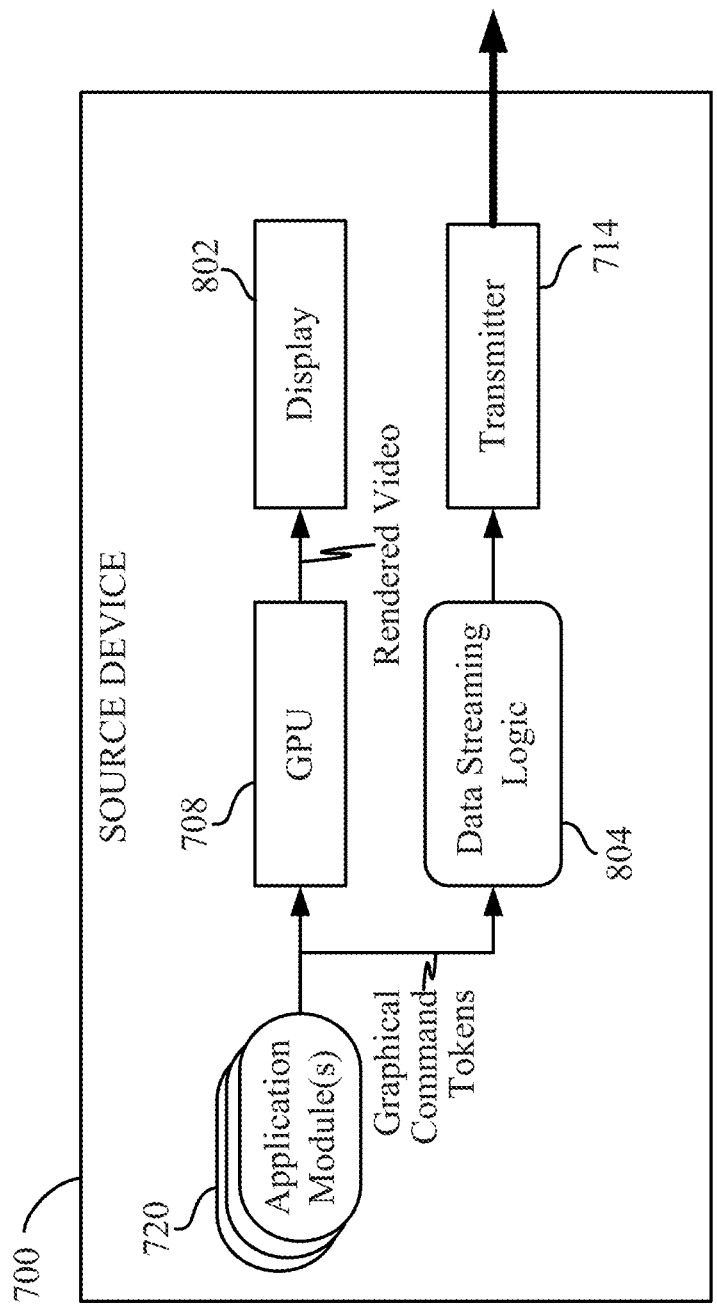
FIG. 8 is a conceptual block diagram illustrating an example data flow within a source device according to at least one implementation of present disclosure.

In operation, the source device 700 selects frames to be dropped, and then skips transmitting those frames to a sink device. FIG. 8 is a conceptual block diagram illustrating an example data flow within a source device 700 according to at least one implementation of present disclosure. As shown, one or more of the application modules 720 of the source device 700 may output graphical command tokens, e.g., to the GPU 708. In some examples, the GPU 708 may render the graphical command tokens into video data and output the rendered video to a display 802. In some examples, the GPU 708 may not render the graphical command tokens. In accordance with one or more techniques of this disclosure, the data streaming logic 804 (e.g., the data streaming circuit/module 710 and/or the data streaming operations 716) may capture the graphical command tokens at an input of the CPU 708. The data streaming logic 804 may determine that a delay is greater than a threshold, and may process the graphical command tokens and output graphical command tokens to the transmitter 714, where the output graphical command tokens skips one or more frames of the video data. For instance, the data streaming logic 804 may generate graphical command tokens associated with a plurality of frames making up a sequence of frames, where the plurality of frames skips one or more frames from the sequence. The transmitter 714 can output the graphical command tokens to a sink device.

Figure 9:
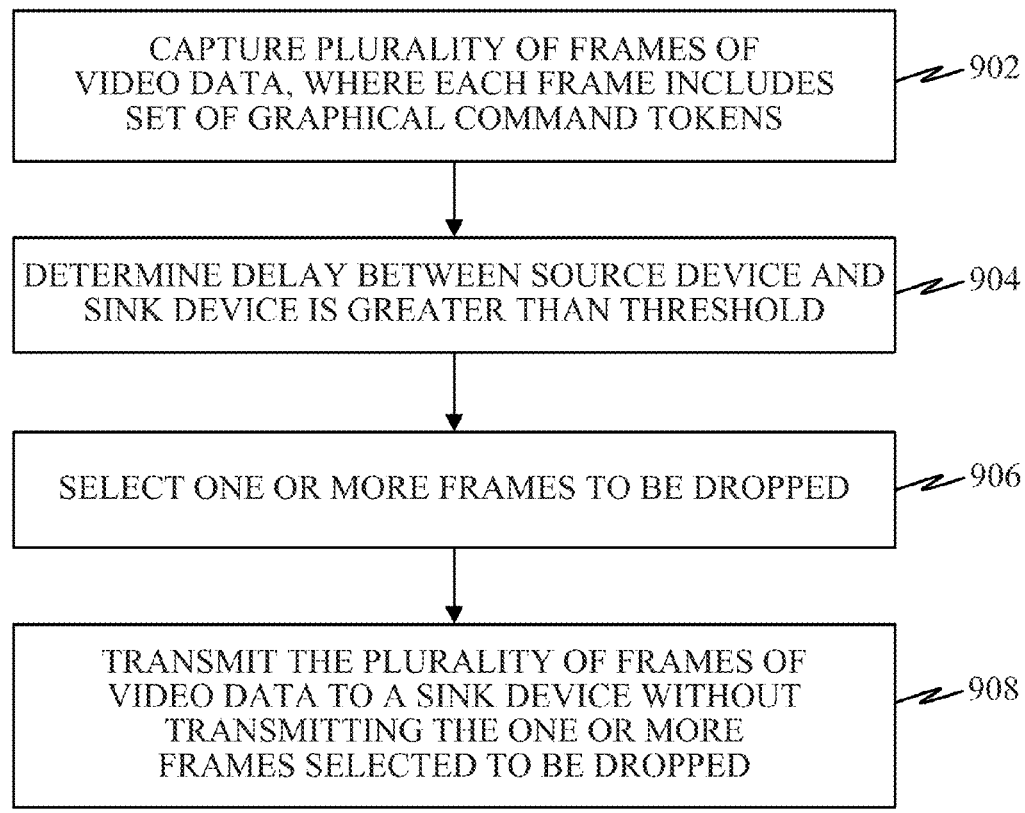
FIG. 9 is a flow diagram illustrating at least one example of a method operational on source device.

FIG. 9 is a flow diagram illustrating at least one example of a method operational on source device, such as the source device 700. Referring to FIGS. 7 and 9, the source device 700 can capture a plurality of frames of video data at 902. For example, the source device 700 may include logic (e.g., data streaming circuit/module 710 and/or data streaming operations 716) to capture the plurality of frames of video data. Each frame of video data may include a set of graphical command tokens (e.g., tokens of OpenGL commands) renderable into the respective frame. In some examples, a frame may also include one or more texture elements.

At 904, the source device 700 may determine whether a delay between the source device 700 and a sink device is greater than a predefined threshold. In some examples, the source device 700 may include logic (e.g., data streaming circuit/module 710 and/or data streaming operations 716) to calculate a delay between the source device 700 and a sink device.

According to at least one example, the logic (e.g., data streaming circuit/module 710 and/or data streaming operations 716) may calculate the delay by comparing a timestamp of the current frame prepared to be sent against the current system time at the source device 700. The source device 700 may compare the difference to a predefined threshold. If the difference is greater than the predefined threshold, then the current frame may be determined to be late.

According to at least one example, the source device 700 may receive a message from the sink device including a timestamp associated with the currently presented frame at the sink device. The source device 700 may include logic (e.g., data streaming circuit/module 710 and/or data streaming operations 716) to compare the timestamp of the currently presented frame as reported by the sink device against the current system time at the source device 700. The logic (e.g., data streaming circuit/module 710 and/or data streaming operations 716) may also take into account round trip times to determine the delay between displays at the two devices. If the calculated delay is greater than a predefined threshold, then the source device 700 can determine that the currently presented frame is late.

When the source device 700 determines at 904 that the delay with the sink device is greater than the threshold, the source device 700 can initiate frame dropping by selecting one or more frames to be dropped at 906. For example, the source device 700 may include logic (e.g., data streaming circuit/module 710 and/or data streaming operations 716) to select one or more frames to be dropped. This logic (e.g., data streaming circuit/module 710 and/or data streaming operations 716) may employ various selection criteria according to one or more implementations to determine whether a frame should or should not be dropped. By way of example, at least some criteria may include whether the frame is one of the first two frames, whether the frame contains any textures, whether the frame has the same number of tokens as its previous frame, whether a frame has been dropped within a previous number N frames prior to the current frame, and/or whether there remains a delay between the source device 700 and the sink device.

Figure 10:
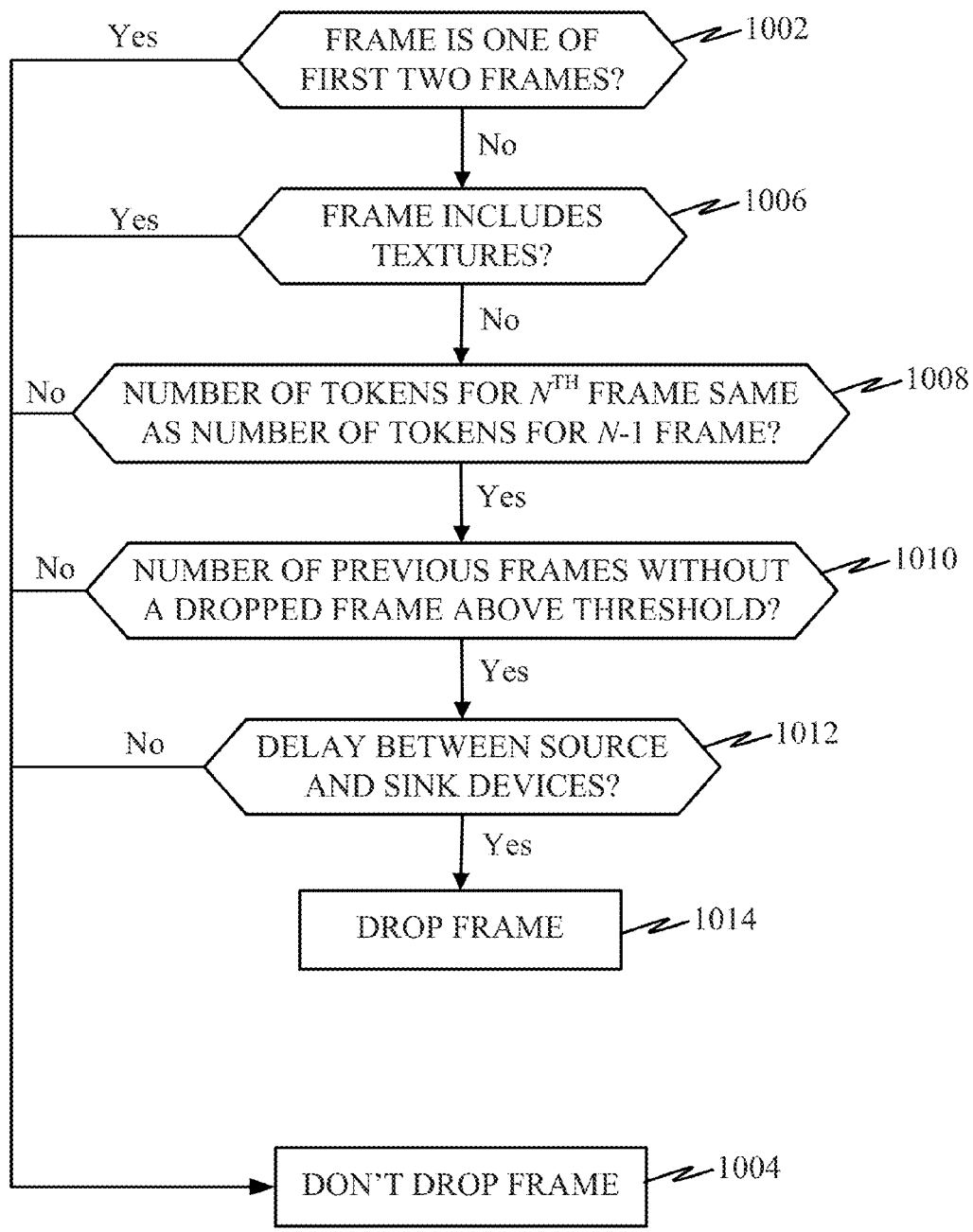
FIG. 10 is a flow diagram illustrating operations that may be implemented by logic included at a source device to select frames to be dropped, according to at least one example of the present disclosure.

FIG. 10 is a flow diagram illustrating an example of operations that may be implemented by logic included at the source device 700 (e.g., data streaming circuit/module 710 and/or data streaming operations 716) to select frames to be dropped. For each frame of video data, the logic at the source device 700 (e.g., data streaming circuit/module 710 and/or data streaming operations 716) may determine at decision 1002 whether the frame is one of the first two frames. In some instances, the first couple of frames may include a significant amount of video data that will be used for rendering subsequent frames. If the sink device is missing this data, it may result in the inability to completely render the frame. If the frame is, therefore, one of the first two frames, the logic at the source device 700 (e.g., data streaming circuit/module 710 and/or data streaming operations 716) may determine that the frame should not be dropped at operation 1004. If the frame is not one of the first two frames, the logic at the source device 700 (e.g., data streaming circuit/module 710 and/or data streaming operations 716) may determine that the frame is still a candidate to be dropped.

At decision 1006, the logic at the source device 700 (e.g., data streaming circuit/module 710 and/or data streaming operations 716) may determine whether the frame includes texture elements. Texture elements typically include video data that is used to render several subsequent frames. If the frame includes texture elements, then the logic at the source device 700 (e.g., data streaming circuit/module 710 and/or data streaming operations 716) may determine that the frame should not be dropped at operation 1004. On the other hand, if the frame does not include texture elements, the logic at the source device 700 (e.g., data streaming circuit/module 710 and/or data streaming operations 716) may determine that the frame is still a candidate to be dropped.

At decision 1008, the logic at the source device 700 e.g. data streaming circuit/module 710 and/or data streaming operations 716) may determine whether the number of tokens for the frame (e.g., the Nth frame) is the same as the number of tokens for the previous frame (e.g., the N−1 frame). When the frame includes the same number of tokens as the previous frame, it may indicate that the frame includes a similar background and similar objects as the previous frame, with the differences being that some of the objects may be positioned in different locations on the screen between the two frames. If the number of tokens for the frame (e.g., the Nth frame) is not the same as the number of tokens for the previous frame (e.g., the N−1 frame), the logic at the source device 700 (e.g., data streaming circuit/module 710 and/or data streaming operations 716) may determine that the frame should not be dropped at operation 1004. If, however, the number of tokens for the frame (e.g., the Nth frame) is the same as the number of tokens for the previous frame (e.g., the N−1 frame), the logic at the source device 700 (e.g., data streaming circuit/module 710 and/or data streaming operations 716) may determine that the frame is still a candidate to be dropped.

At decision 1010, the logic at the source device 700 (e.g., data streaming circuit/module 710 and/or data streaming operations 716) may determine whether a threshold number of previous frames have been sent without any frames being dropped. If too many consecutive frames, or too many frames within a specific period of time are dropped, the video data rendered at the sink device may be relatively jittery. That is, too many dropped frames within a relatively short period of time may result in objects movement to be visibly jumpy instead of smooth to a viewer. If there has not been a threshold number of previous frames without a dropped frame, the logic at the source device 700 (e.g., data streaming circuit/module 710 and/or data streaming operations 716) may determine that the frame should not be dropped at operation 1004. If there has been a threshold number of pervious frames without a dropped frame, the logic at the source device 700 (e.g., data streaming circuit/module 710 and/or data streaming operations 716) may determine that the frame is still a candidate to be dropped.

In at least one example, the threshold at decision 1010 may be two frames, such that if one frame is dropped in the previous two frames, the current frame may not be dropped. This threshold, however, may vary according to the specific application. In some examples, the threshold may be adaptive. For example, the logic at the source device 700 (e.g., data streaming circuit/module 710 and/or data streaming operations 716) may adapt the threshold based on similarity between successive frames and/or channel conditions and wireless link throughput.

At decision 1012, the logic at the source device 700 (e.g., data streaming circuit/module 710 and/or data streaming operations 716) may determine whether there is still a delay between the source device 700 and the sink device. Frame dropping can enable the source device 700 to be better synchronized with the sink device. In some examples, the source device 700 can keep track of the total number of frames that have been dropped, compared to what the original delay was calculated to be. For instance, if the delay was determined to be 2 seconds at 30 frames per second (fps), then the source device 700 can determine that 60 frames need to be dropped to remove the delay. If there is no longer a delay, the logic at the source device 700 (e.g., data streaming circuit/module 710 and/or data streaming operations 716) may determine that the frame should not be dropped at operation 1004. If there is still a delay, the logic at the source device 700 (e.g., data streaming circuit/module 710 and/or data streaming operations 716) may determine that the frame is still a candidate to be dropped.

In this example, if all of the above described conditions are met, the logic at the source device 700 (e.g., data streaming circuit/module 710 and/or data streaming operations 716) may select the frame to be dropped at operation 1014. Although FIG. 10 depicts several conditions, different implementations may employ more, fewer, and/or different conditions for determining whether or not to drop a specific frame from transmission to the sink device.

Referring again to FIG. 9, the source device 700 may transmit the plurality of frames of the video data to a sink device without transmitting the one or more frames selected to be dropped at 908. In other words, the frames of video data can be transmitted to a sink device, but the frames selected to be dropped may simply be skipped during the transmission, such that the dropped frames are not transmitted. In some examples, the source device 700 may include logic (e.g., data streaming circuit/module 710 and/or data streaming operations 716) to transmit the plurality of frames, minus the dropped frames, via the transmitter 714 of the communications interface 704.

Figure 11:
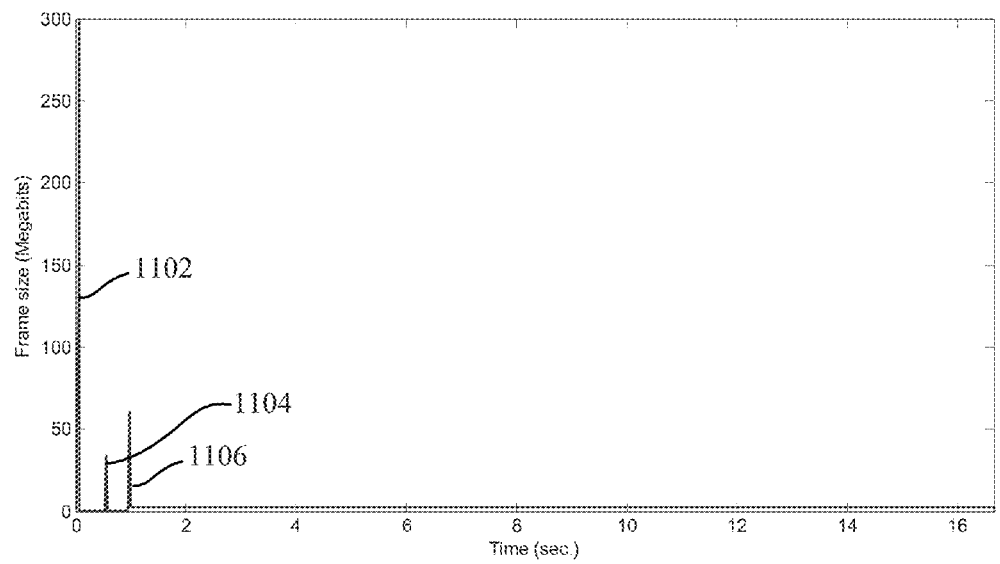
FIG. 11 is a graph similar to FIG. 4 illustrating a frame sizes over a period of time when initiating screen sharing for a video game known as FRUIT NINJA according to at least one example.

Employing one or more frame dropping features of the present disclosure, delays between a source device and a sink device can be eliminated without significantly affecting the user experience in a negative manner. Referring to FIG. 11, the same graph from FIG. 4 is illustrated, depicting the frame sizes over time for the game FRUIT NINJA when initiating the game. As noted above, there are several data peaks that occur, including the peaks 1102 at the beginning of around 300 Mb, peak 1104 of about 30 Mb, and peak 1106 of a little more than 50 Mb of data.

Figure 12:
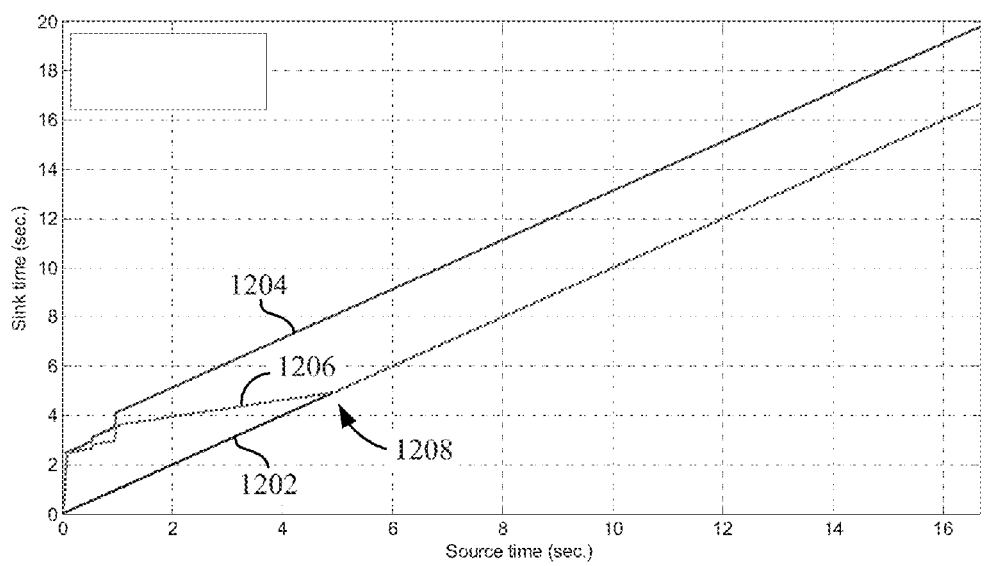
FIG. 12 is a graph illustrating a delay between a source device and a sink device resulting from the frame transmissions associated with FIG. 11, and corrections occurring from frame dropping, according to at least one example of the present disclosure.

Referring now to FIG. 12, a graph similar to the graph in FIG. 5 is shown, illustrating the time when each frame is rendered at the source device and the sink device. In FIG. 12, the desired reference line 1202 (similar to 502 in FIG. 5) is depicted, as well as the line 1204 (similar to 504 in FIG. 5) depicting the delay resulting from the data peaks from FIG. 11. Additionally, FIG. 12 illustrates line 1206 depicting the adjustment to the delays resulting from the frame dropping features of the present disclosure. That is, as shown by FIG. 12, after the initial delay occurs as a result of the data peak 1102 in FIG. 11, the source device can initiate frame dropping as described herein. As frames continue to be dropped by the source device, the curve 1206 begins to come closer and closer to the desired reference line 1202. At 1208, the line 1206 is at least substantially equal to the reference line 1202. At that point, the source device can stop frame dropping until a subsequent delay occurs.

Figure 13:
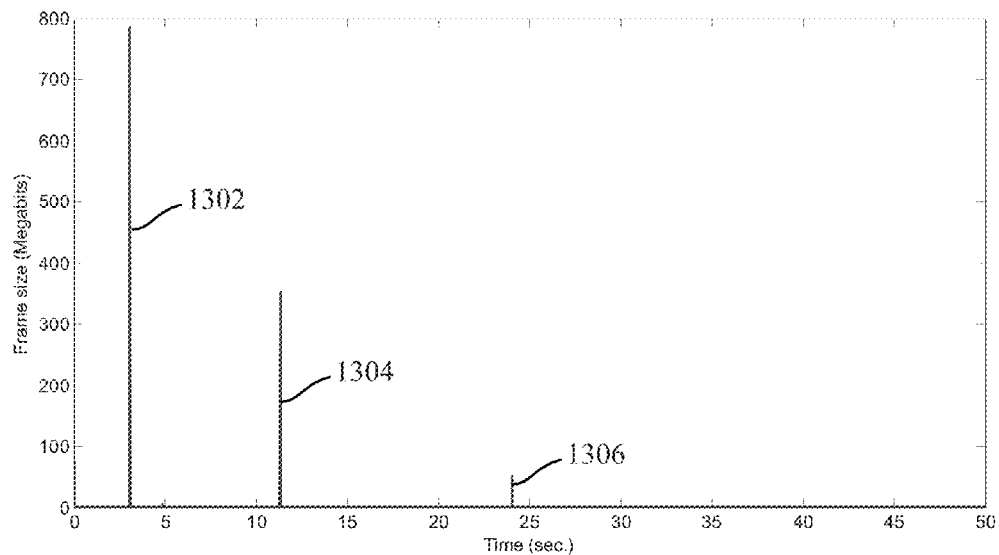
FIG. 13 is a graph illustrating a frame sizes over a period of time when employing screen sharing for a video game known as ANGRY BIRDS according to at least one example of the present disclosure.
Figure 14:
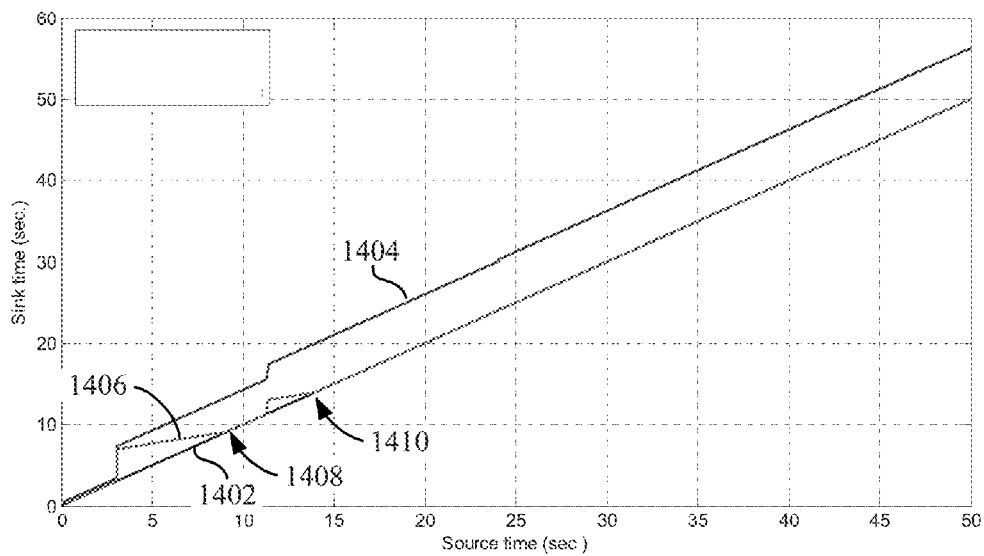
FIG. 14 is a graph illustrating delays between a source device and a sink device resulting from the frame transmissions associated with FIG. 13, and corrections occurring from frame dropping in according with at least one example of this disclosure.

Turning now to FIG. 13, another graph is shown, depicting frame sizes over time for another popular game known as ANGRY BIRDS. As shown, a few relatively large data peaks occur during the depicted period of game play, including a first data peak 1302 of almost 800 Mb, a second data peak 1304 of almost 400 Mb, and a third data peak 1306 of about 50 Mb. With reference now to FIG. 14, the delays resulting from these data peaks are depicted assuming a 200 Mbps bit-rate for transmissions from the source device to the sink device. In FIG. 14, the desired reference line is depicted as line 1402. Without the frame dropping features described herein, a significant delay results between the source device and the sink device, as depicted by line 1404. However, the source devices of the present disclosure can initiate frame dropping immediately after the first data peak 1302, as depicted by line 1406. Such frame dropping can re-synchronize the source and sink devices by about point 1408 following the first data peak 1302. When the two devices are synchronized, the source device can stop frame dropping.

As shown, the second data peak 1304 also results in a delay, upon which the source device can reinitiate the frame dropping features of the present disclosure. Such frame dropping once again enables the source device and sink device to be at least substantially synchronized at point 1410.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13 and/or 14 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 6, 7, and/or 8 may be configured to perform or employ one or more of the methods, features, parameters, and/or steps described in FIGS. 2, 3, 4, 5, 6, 9, 10, 11, 12, 13, and/or 14. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A source device, comprising:
   a communications interface; and
   a processing circuit coupled to the communications interface, the processing circuit comprising logic to:
   capture a plurality of frames of video data, each frame including a set of graphical command tokens;
   determine a delay between the source device and a sink device is above a threshold;
   in response to the determination that the delay between the source device and the sink device is above a threshold, select at least one frame to be dropped; and
   transmit via the communications interface the plurality of frames of video data without transmitting the at least one frame selected to be dropped.

2. The source device of claim 1, wherein at least one frame of the captured frames further includes one or more texture elements.

3. The source device of claim 1, wherein the logic to determine the delay between the source device and the sink device is above the threshold comprises logic to:
   compare a timestamp of a current frame with a system time at the source device; and
   determine that a difference between the timestamp of the current frame and the system time is above a threshold.

4. The source device of claim 1, wherein the logic to determine the delay between the source device and the sink device is above the threshold comprises logic to:
   receive a transmission via the communications interface from the sink device, wherein the transmission includes a timestamp associated with a frame presented at the sink device;
   compare the timestamp received from the sink device with a current system time at the source device; and
   determine that a difference between the timestamp received from the sink device and the current system time is above a threshold.

5. The source device of claim 1, wherein the logic to select at least one frame to be dropped comprises logic to:
   select the at least one frame to be dropped when the at least one frame is not one of a first frame or a second frame of the video data.

6. The source device of claim 1, wherein the logic to select at least one frame to be dropped comprises logic to:
   select the at least one frame to be dropped when the at least one frame does not include any texture elements.

7. The source device of claim 1, wherein the logic to select at least one frame to be dropped comprises logic to:

select the at least one frame to be dropped when the at least one frame includes a number of tokens equal to a number of tokens included in an immediately preceding frame.

8. The source device of claim 1, wherein the logic to select at least one frame to be dropped comprises logic to:
select the at least one frame to be dropped when at least a predefined number of preceding frames have not been dropped.

9. The source device of claim 1, wherein the logic to select at least one frame to be dropped comprises logic to:
select the at least one frame to be dropped when a delay remains between the source device and the sink device.

10. A method operational on a source device, comprising:
capturing a plurality of frames of video data, wherein each frame includes a set of graphical command tokens;
determining a delay between the source device and a sink device is above a threshold;
selecting at least one frame to be dropped in response to determining that the delay between the source device and the sink device is above a threshold; and
transmitting the plurality of frames of video data without transmitting the at least one frame selected to be dropped.

11. The method of claim 10, wherein at least one frame of the captured frames further includes one or more texture elements.

12. The method of claim 10, wherein determining the delay between the source device and the sink device is above the threshold comprises:
comparing a timestamp of a current frame with a system time at the source device; and
determining that a difference between the timestamp of the current frame and the system time is above a threshold.

13. The method of claim 10, wherein determining the delay between the source device and the sink device is above a threshold comprises:
receiving a transmission from the sink device, wherein the transmission includes a timestamp associated with a frame presented at the sink device;
comparing the received timestamp with a current system time at the source device; and
determining that a difference between the received timestamp and the current system time is above a threshold.

14. The method of claim 10, wherein selecting at least one frame to be dropped comprises:
selecting the at least one frame to be dropped when the at least one frame is not one of the first two frames of the video data.

15. The method of claim 10, wherein selecting at least one frame to be dropped comprises:
selecting the at least one frame to be dropped when the at least one frame does not include any texture elements.

16. The method of claim 10, wherein selecting at least one frame to be dropped comprises:
selecting the at least one frame to be dropped when the at least one frame includes a number of tokens equal to a number of tokens included in an immediately preceding frame.

17. The method of claim 10, wherein selecting at least one frame to be dropped comprises:
selecting the at least one frame to be dropped when at least a predefined number of preceding frames have not been dropped.

18. The method of claim 10, wherein selecting at least one frame to be dropped comprises:
selecting the at least one frame to be dropped when there is still a delay between the source device and the sink device.

19. A source device, comprising:
means for capturing a plurality of frames of video data, each frame including a set of graphical command tokens;
means for determining a delay between the source device and a sink device is above a threshold;
means for selecting at least one frame to be dropped in response to determining that the delay between the source device and the sink device is above a threshold; and
means for transmitting the plurality of frames of video data without transmitting the at least one frame selected to be dropped.

20. The source device of claim 19, wherein the means for determining the delay between the source device and the sink device is above the threshold comprises:
means for comparing a timestamp of a current frame with a system time at the source device; and
means for determining that a difference between the timestamp of the current frame and the system time is above a threshold.

21. The source device of claim 19, wherein the means for determining the delay between the source device and the sink device is above the threshold comprises:
means for receiving a transmission from the sink device, wherein the transmission includes a timestamp associated with a frame presented at the sink device;
means for comparing the received timestamp with a current system time at the source device; and
means for determining that a difference between the received timestamp and the current system time is above a threshold.

22. The source device of claim 19, wherein the means for selecting at least one frame to be dropped comprises:
means for employing one or more selection criteria from a group of selection criteria to determine whether or not to drop each frame, the group of selection criteria comprising:
whether a current frame is one of a first frame or a second frame;
whether the current frame includes any texture elements;
whether the current frame has the same number of tokens as its preceding frame;
whether another frame has been dropped within a predefined number of frames prior to the current frame; and
whether there remains a delay between the source device and the sink device.

23. The source device of claim 19, wherein at least one frame of the captured frames further includes one or more texture elements.

24. A non-transitory processor-readable storage medium storing processor-executable programming for causing a processing circuit to:
capture a plurality of frames of video data, wherein each frame includes a set of graphical command tokens;
determine a delay between a source device and a sink device is above a threshold;
select at least one frame to be dropped in response to determining that the delay between the source device and the sink device is above a threshold; and transmit the plurality of frames of video data without transmitting the at least one frame selected to be dropped.

25. The non-transitory processor-readable storage medium of claim 24, wherein the processor-executable programming for causing a processing circuit to determine the delay between the source device and the sink device is above the threshold comprises processor-executable programming for causing a processing circuit to:
  compare a timestamp of a current frame with a system time at the source device; and
  determine that a difference between the timestamp of the current frame and the system time is above a threshold.

26. The non-transitory processor-readable storage medium of claim 24, wherein the processor-executable programming for causing a processing circuit to determine the delay between the source device and the sink device is above the threshold comprises processor-executable programming for causing a processing circuit to:
  receive a transmission from the sink device, wherein the transmission includes a timestamp associated with a frame presented at the sink device;
  compare the received timestamp with a current system time at the source device; and
  determine that a difference between the received timestamp and the current system time is above a threshold.

27. The non-transitory processor-readable storage medium of claim 24, wherein the processor-executable programming for causing a processing circuit to select at least one frame to be dropped comprises processor-executable programming for causing a processing circuit to:
  employ one or more selection criteria from a group of selection criteria to determine whether or not to drop each frame, the group of selection criteria comprising:
    whether a current frame is one of the first two frames;
    whether the current frame includes any texture elements;
    whether the current frame has the same number of tokens as its preceding frame;
    whether another frame has been dropped within a predefined number of frames prior to the current frame; and
    whether there remains a delay between the source device and the sink device.

28. The non-transitory processor-readable storage medium of claim 24, wherein at least one frame of the captured frames further includes one or more texture elements.

* * * * *